United States Patent
Larsson (10) Patent No.: US 11,554,513 B1
(45) Date of Patent: Jan. 17, 2023

(54) PORTABLE SAW FENCE

(71) Applicant: Bruce Larsson, Dudley, MA (US)

(72) Inventor: Bruce Larsson, Dudley, MA (US)

( * ) Notice: Subject to any disclaimer, the term of this patent is extended or adjusted under 35 U.S.C. 154(b) by 39 days.

(21) Appl. No.: 16/814,882

(22) Filed: Mar. 10, 2020

Related U.S. Application Data (60) Provisional application No. 62/818,858, filed on Mar. 14, 2019.

(51) Int. Cl.
*B27B 27/10* (2006.01)
*B27B 27/02* (2006.01)
*B23D 47/02* (2006.01)

(52) U.S. Cl.
CPC .............. *B27B 27/10* (2013.01); *B27B 27/02* (2013.01); *B23D 47/025* (2013.01)

(58) Field of Classification Search
CPC .............................. B27B 27/102; B27B 27/10
See application file for complete search history.

(56) References Cited

U.S. PATENT DOCUMENTS

| | | | | |
|---|---|---|---|---|
| 2,711,763 A | * | 6/1955 | Brown | B27G 21/00 144/251.1 |
| 2,744,549 A | * | 5/1956 | Johnson | B23Q 3/005 83/438 |
| 2,754,859 A | * | 7/1956 | Ocenasek | B23Q 3/005 83/438 |
| 3,827,685 A | * | 8/1974 | Wennes | B25B 5/08 269/229 |
| 3,910,142 A | | 10/1975 | Jureit | |
| 4,798,113 A | | 1/1989 | Viazanko | |
| 4,817,693 A | | 4/1989 | Schuler | |
| 4,864,941 A | | 9/1989 | Goulter | |
| 5,038,650 A | * | 8/1991 | Hodge | B23D 57/0092 83/471.3 |
| 5,083,486 A | * | 1/1992 | Allison | B26D 1/03 83/171 |
| 5,105,862 A | | 4/1992 | Skinner | |
| 5,195,730 A | * | 3/1993 | Taylor | B23Q 1/28 144/253.1 |
| 5,327,653 A | | 7/1994 | Pistorius | |
| 5,423,360 A | * | 6/1995 | Taylor | B23Q 3/002 144/253.1 |
| 5,444,635 A | | 8/1995 | Blaine | |
| 5,617,909 A | | 4/1997 | Duginske | |

(Continued)

*Primary Examiner* — Evan H MacFarlane
*Assistant Examiner* — Fernando A Ayala
(74) *Attorney, Agent, or Firm* — Quickpatents, LLC; Kevin Prince (57) ABSTRACT

A fence apparatus for handling a workpiece and resting on a support surface includes a rigid rectanguloid base, a top side of which includes a plurality of parallel guide slots. A bottom side includes at least three height-adjustable feet. A fence assembly includes an adjustable fence bracket and a fence. In some embodiments a top edge of the fence includes one of the guide slots, and the flip stop includes one of the guides for cooperating therewith to allow the flip stop to slide along the top edge of the fence. The flip stop may further include a removable pusher bar extending parallel to the fence for pushing the workpiece close to the tool. Two side L-brackets are each adapted for fixing with sides of the base and for fixing with the support surface. The fence apparatus is fully reversible from left to right.

14 Claims, 6 Drawing Sheets

(56) References Cited

U.S. PATENT DOCUMENTS

| | | | |
|---|---|---|---|
| 6,305,449 B1 * | 10/2001 | Stover | B27C 5/04 144/135.2 |
| 6,340,039 B1 * | 1/2002 | Chang | B23Q 3/002 144/135.2 |
| 6,557,601 B1 | 5/2003 | Taylor | |
| 6,668,696 B1 * | 12/2003 | Krohmer | B23D 47/025 144/286.1 |
| RE38,612 E * | 10/2004 | Tucker | B27C 5/06 409/218 |
| 6,858,857 B2 | 2/2005 | Pease | |
| 6,898,478 B2 | 5/2005 | Dick | |
| 7,073,268 B1 | 7/2006 | Etter | |
| 7,483,765 B2 | 1/2009 | Dick | |
| 7,614,330 B2 | 11/2009 | Griswold | |
| 7,882,772 B2 * | 2/2011 | Wise | B27B 27/10 83/468.2 |
| 7,930,959 B1 | 4/2011 | Greene | |
| 9,221,188 B1 * | 12/2015 | Wisen | B27B 27/10 |
| 9,545,734 B2 | 1/2017 | Suhling | |
| 9,943,975 B2 | 4/2018 | Dick | |
| 2003/0024362 A1 * | 2/2003 | Preuss | B23D 47/042 83/112 |
| 2006/0075862 A1 | 4/2006 | Parks | |
| 2006/0075867 A1 | 4/2006 | Etter | |
| 2006/0086418 A1 * | 4/2006 | Williams | B27M 3/002 144/144.1 |
| 2006/0101961 A1 | 5/2006 | Etter | |
| 2006/0139618 A1 | 6/2006 | Pando | |
| 2008/0081753 A1 * | 4/2008 | Abrott | B31F 1/08 493/59 |
| 2009/0084238 A1 * | 4/2009 | Chang | B27B 27/10 83/441.1 |
| 2009/0299519 A1 | 12/2009 | Dick | |
| 2010/0269661 A1 | 10/2010 | Cox | |
| 2011/0048202 A1 | 3/2011 | Peterson | |
| 2011/0056344 A1 | 3/2011 | Dick | |
| 2011/0175273 A1 | 7/2011 | Dick | |
| 2012/0055308 A1 | 3/2012 | Ota | |
| 2012/0167738 A1 | 7/2012 | Lawlor | |
| 2012/0204688 A1 | 8/2012 | Rowe | |
| 2013/0036890 A1 | 2/2013 | Dick | |
| 2014/0116221 A1 | 5/2014 | Lawlor | |
| 2014/0216228 A1 * | 8/2014 | Zeiler | B23D 45/003 83/483 |
| 2015/0082962 A1 | 3/2015 | Lin | |
| 2016/0052159 A1 | 2/2016 | Lin | |
| 2017/0216942 A1 | 8/2017 | Lin | |
| 2018/0036867 A1 | 2/2018 | Wang | |
| 2018/0036902 A1 | 2/2018 | Frolov | |
| 2018/0178299 A1 | 6/2018 | Fuchs | |
| 2018/0185935 A1 * | 7/2018 | Smith | B27B 27/10 |

* cited by examiner

PORTABLE SAW FENCE

CROSS-REFERENCE TO RELATED APPLICATIONS

This application claims the benefit of U.S. Provisional Patent Application 62/818,658, filed on Mar. 14, 2019, and incorporated herein by reference.

STATEMENT REGARDING FEDERALLY SPONSORED RESEARCH AND DEVELOPMENT

Not Applicable.

FIELD OF THE INVENTION

This invention relates to tools, and more particularly to a portable auxiliary fence for power tools such as miter saws.

BACKGROUND

Miter saw installations having an extended guide or fence for guiding a workpiece towards a tool are well known. However, such extended fences are typically not portable and can be bulky and difficult to handle. Further, such prior art extended fences do not allow for reversible use on either side of the tool, or allow for a flip-stop having a range finder or a pusher bar for handling the workpiece.

Therefore, there is a need for an extended fence apparatus that can be quickly assembled adjacent a tool such as a miter saw, on either the left or right side of the tool as necessary. Such a needed invention would provide for an extended fence with an adjustable flip stop that includes a range finder and/or a pusher bar for handling the workpiece. Such a needed apparatus would be collapsible for ease of transport and storage. The present invention accomplishes these objectives.

SUMMARY OF THE INVENTION

The present device is a fence apparatus for handling a workpiece and resting on a support surface, such as a bench or sawhorse table, that is located proximate a tool. The tool may be a miter saw, radial arm saw, or the like.

A rigid rectanguloid base has a top side, a bottom side, a front side, a rear side, a left side, and a right side. The top side includes a plurality of parallel guide slots traversing from the front side to the rear side. The bottom side includes at least three height-adjustable feet each adapted for resting on the support surface.

A fence assembly includes a fence bracket having at least two guides projecting downwardly into at least two of the guide slots of the top side of the base. The fence assembly further includes a fence having a front side substantially orthogonal to the top side of the base when the fence assembly is engaged with the top side of the base. The front side of the fence preferably includes a plurality of the parallel longitudinally-aligned guide slots, such that a flip stop can be slidably fixed with the fence by engaging the guide slots.

In some embodiments a top edge of the fence includes one of the guide slots, and the flip stop includes one of the guides for cooperating therewith to allow the flip stop to slide along the top edge of the fence. In such an embodiment the flip stop includes a pivot for allowing the flip stop to be pivoted up over the fence and out of the way of the workpiece. When in a lowered position as shown in the figures, the flip stop may be used to abut the workpiece at a particular location in relation to the tool, and/or to push the workpiece towards the tool by sliding the flip stop along the guide slots in the top edge or front surface of the fence.

The flip stop may further include a removable pusher bar extending parallel to the fence and adapted for pushing the workpiece close to the tool, or to hold the workpiece in close proximity to the tool. The flip stop may further include an electric range finder for determining the distance between a side surface of the flip stop and the tool.

The fence preferably includes a left section telescopingly-engaged with a right section of the fence. The top edge of the fence is fixed with the right section and includes one of the guides for engaging one of the guide slots in a top side of the left section. As such the left section and the right section can be mutually fixed together. The left section and the right section are further slidably fixed mutually together at a telescoping bar that engages a lower groove of each section. The right section can move between a collapsed configuration and an extended configuration in order to accommodate longer workpieces. In such an embodiment the flip stop preferably includes a locking thumb screw for fixing the flip stop with the fence.

Two side L-brackets are each adapted for fixing with the left side or the right side of the base. Each side L-bracket further includes a lower side adapted for fixing with the support surface. Each side L-bracket preferably includes at least two vertical slots on an upright portion of the side L-bracket. The vertical slots are adapted for receiving a threaded thumb screw that engages a threaded aperture of either the left side or the right side of the base, such that the side L-brackets are vertically adjustable on the sides of the base. The lower side of each L-bracket further includes the slots or apertures for receiving woods screws or other mechanical fasteners for securing the base to the support surface, which is typically a wooden bench or plank.

The fence apparatus is fully reversible in the sense that it can be positioned on either a left side of the tool or on the right side of the tool. The range finder and the pusher bar can be fixed to either side of the flip stop. As such, two of the fence apparatuses can be used on either side of the tool as desired.

The present invention is an extended fence apparatus that can be quickly assembled adjacent a tool such as a miter saw, on either the left or right side of the tool as necessary. The present invention provides for an extendable fence with an adjustable flip stop that includes a range finder and/or a pusher bar for handling the workpiece. The present device is collapsible for ease of transport and storage. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
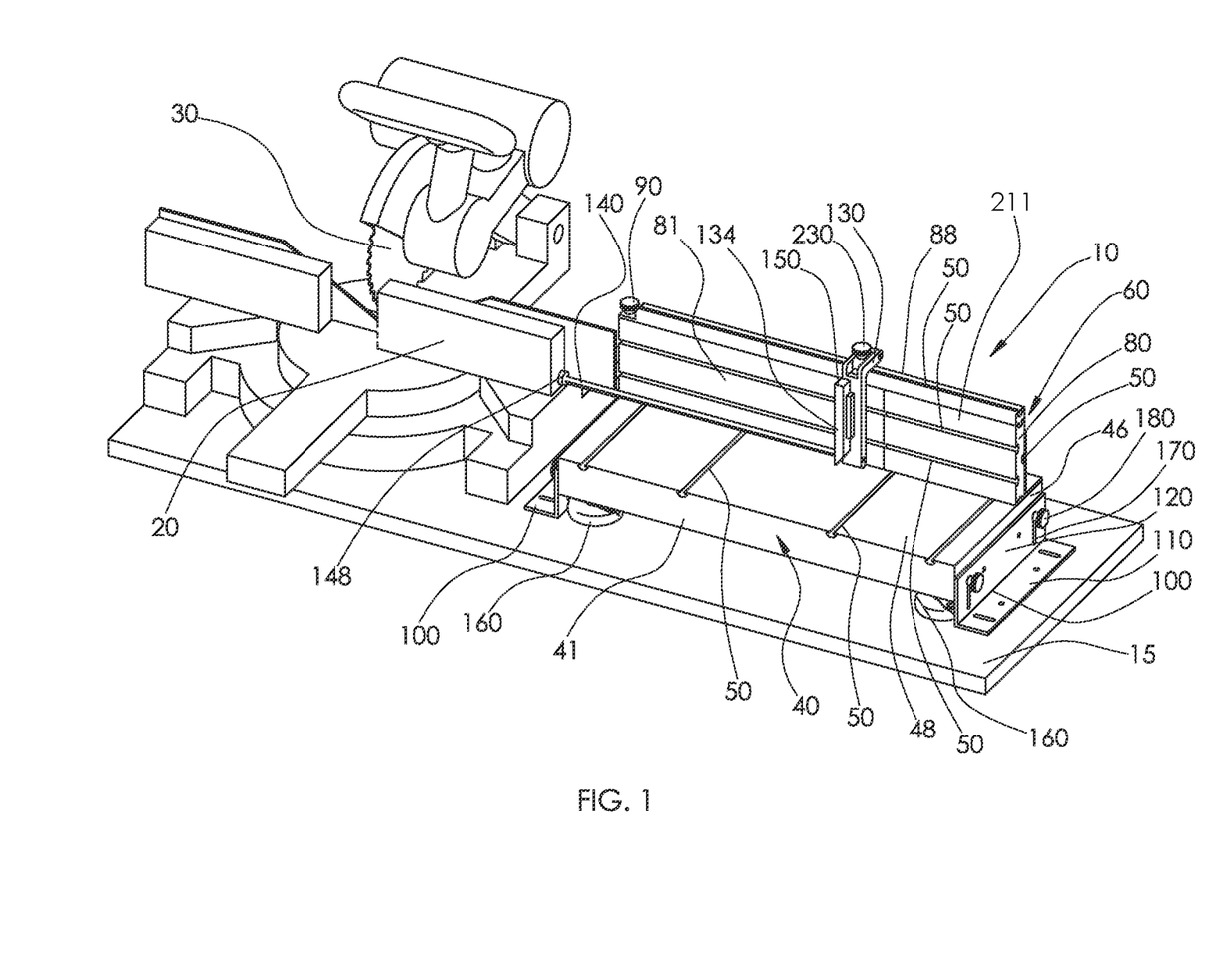
FIG. 1 is a perspective view of the invention, showing a fence thereof in a collapsed configuration.
Figure 2:
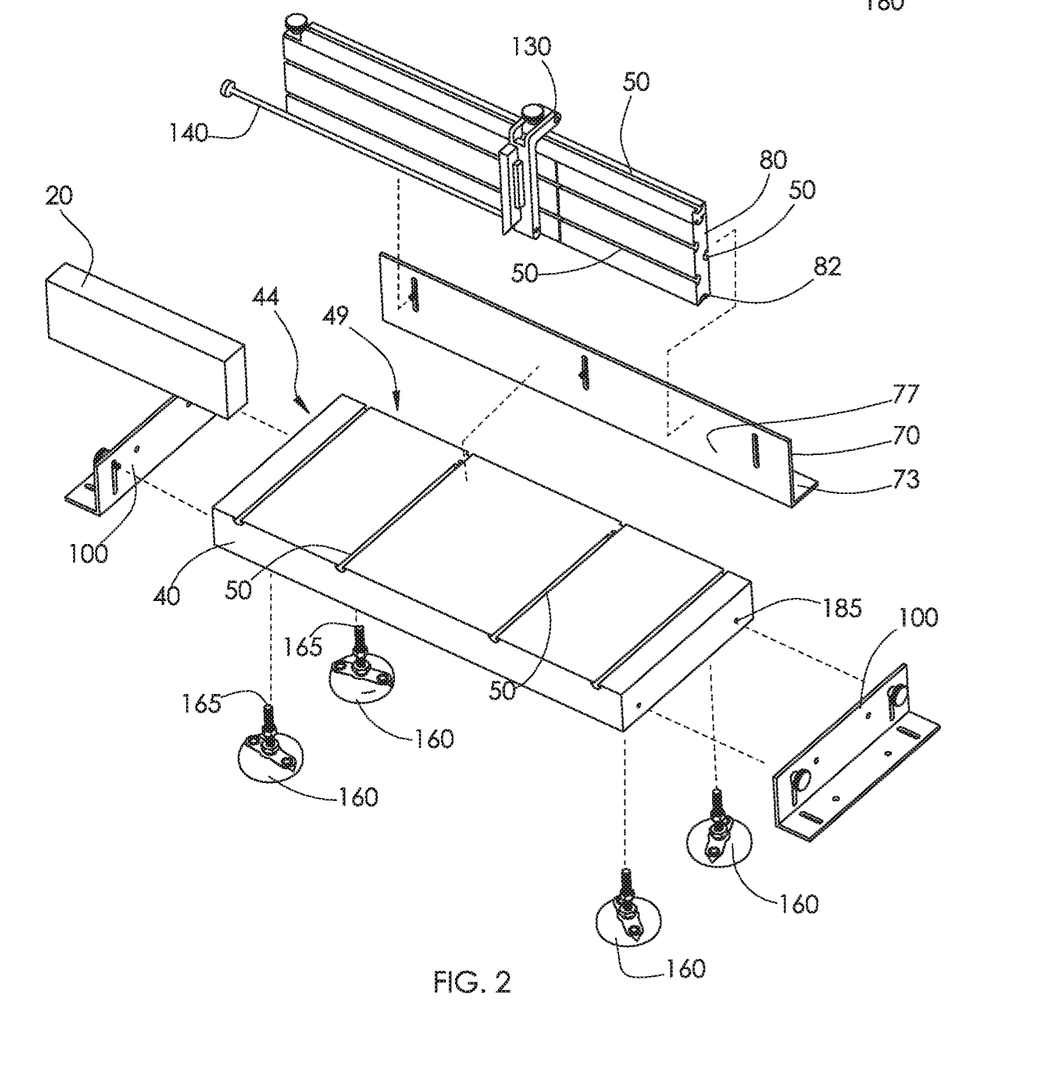
FIG. 2 is an exploded perspective view thereof.

FIGS. 1 and 2 illustrate a fence apparatus 10 for handling a workpiece 20 and resting on a support surface 15, such as a bench or table fashioned with a wood plank and a couple of sawhorses, proximate a tool 30. The tool 30 may be a miter saw, radial arm saw, or other tool, either powered or manually-driven such as a hacksaw.

Figure 3:
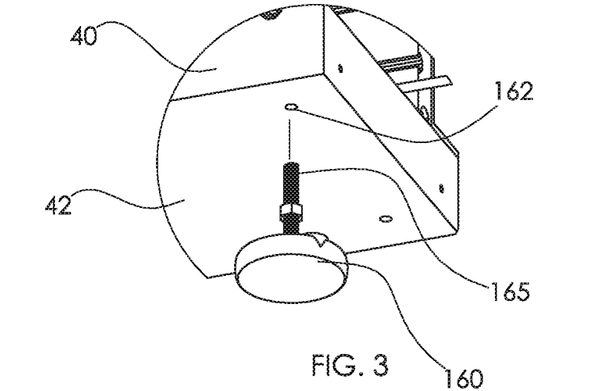
FIG. 3 is a partial bottom perspective view thereof, illustrating an adjustable foot of the invention.

A rigid rectanguloid base 40 has a top side 48, a bottom side 42, a front side 41, a rear side 49, a left side 44, and a right side 46. The top side 48 includes a plurality of parallel guide slots 50 traversing from the front side 41 to the rear side 49. The bottom side 42 includes at least three height-adjustable feet 160 each adapted for resting on the support surface 15. Preferably each height-adjustable foot 160 includes a threaded shaft 165 for engaging a threaded aperture 162 of the bottom side 42 of the base 40 (FIG. 3). The base 40 may be made from a rigid metal, wood, or plastic material.

A fence assembly 60 includes a fence bracket 70 having at least two guides 90 projecting downwardly into at least two of the guide slots 50 of the top side 48 of the base 40. Preferably each guide 90 is a combination of a machine screw with a head on one end and terminated with a threaded shaft that engages a threaded thumb nut. The fence assembly 60 further includes a fence 80 having a front side 81 substantially orthogonal to the top side 48 of the base 40 when the fence assembly 60 is engaged with the top side 48 of the base 40. The front side 81 of the fence 80 preferably includes a plurality of the parallel longitudinally-aligned guide slots 50, such that a flip stop 130 can be slidably fixed with the fence 80 by engaging the guide slots 50. The fence 80 and fence bracket 70 are preferably made from a rigid metal material. The fence 80 may also be made from a rigid plastic or wood material. The fence assembly 60 is quickly removable from the base 40 for compact storage and transportation.

Figure 6:
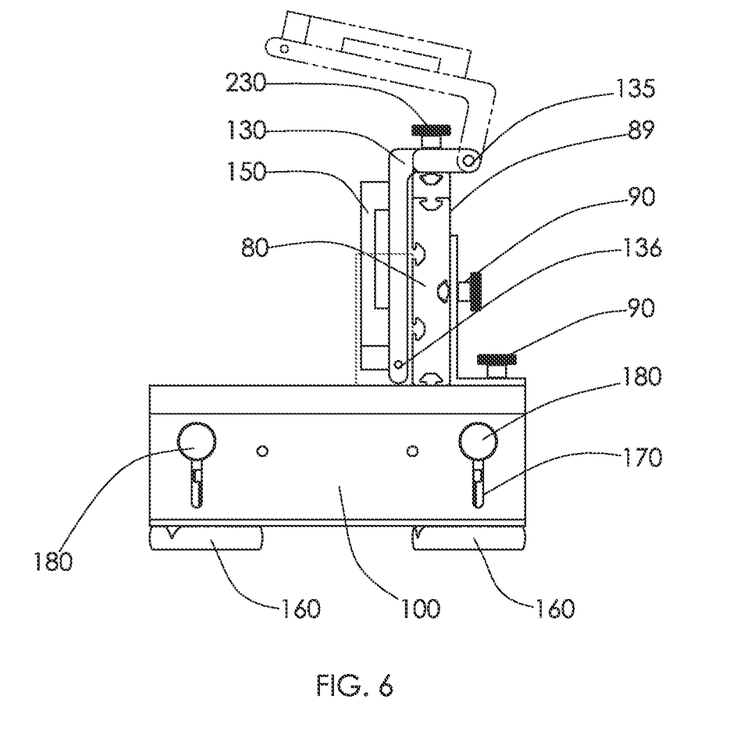
FIG. 6 is a right-side elevational view of the invention.

In some embodiments a top edge 88 of the fence 80 includes one of the guide slots 50, and the flip stop 130 includes one of the guides 90 for cooperating therewith to allow the flip stop 130 to slide along the top edge 88 of the fence 80. In such an embodiment the flip stop 130 includes a pivot 135 for allowing the flip stop 130 to be pivoted up over the fence 80 (illustrated in broken lines in FIG. 6) and out of the way of the workpiece 20. When in a lowered position as shown in the figures, the flip stop 130 may be used to abut the workpiece 20 at a particular location in relation to the tool 30, and/or to push the workpiece 20 towards the tool 30 by sliding the flip stop 130 along the guide slots 50 in the top edge 88 or front side 81 of the fence 80.

The flip stop 130 may further include a removable pusher bar 140 extending parallel to the fence 80 and adapted for pushing the workpiece 20 close to the tool 30, or to hold the workpiece 20 in close proximity to the tool 30. The pusher bar 140 is preferably screwed into a threaded aperture 136 of the flip stop 130 (FIG. 6), inserted with a friction fit, or the like. Preferably the pusher bar 140 is made from a metal material.

The flip stop 130 may further include an electric range finder 150 for determining the distance between a side surface 134 of the flip stop 130 and the tool 30. Such a range finder 150 may be a laser range finder, a sonic range finder, or the like. In some embodiments a mode on the range finder subtracts the length of the pusher bar, such that the range finder 150 displays a distance between an end 148 of the pusher bar 140 and the tool 30.

Figure 4:
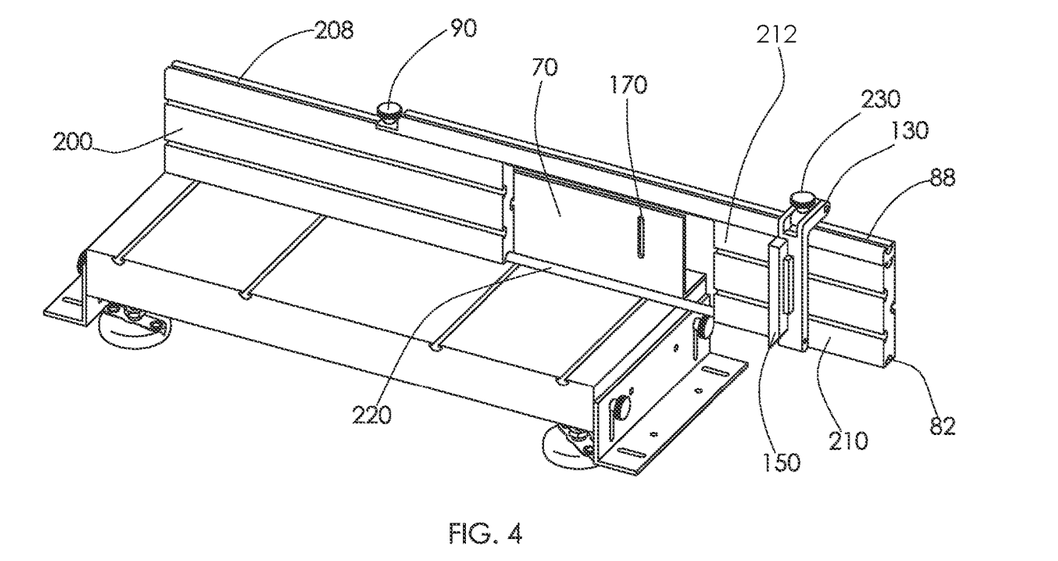
FIG. 4 is a perspective view of the invention, showing the fence in an expanded configuration.
Figure 5:
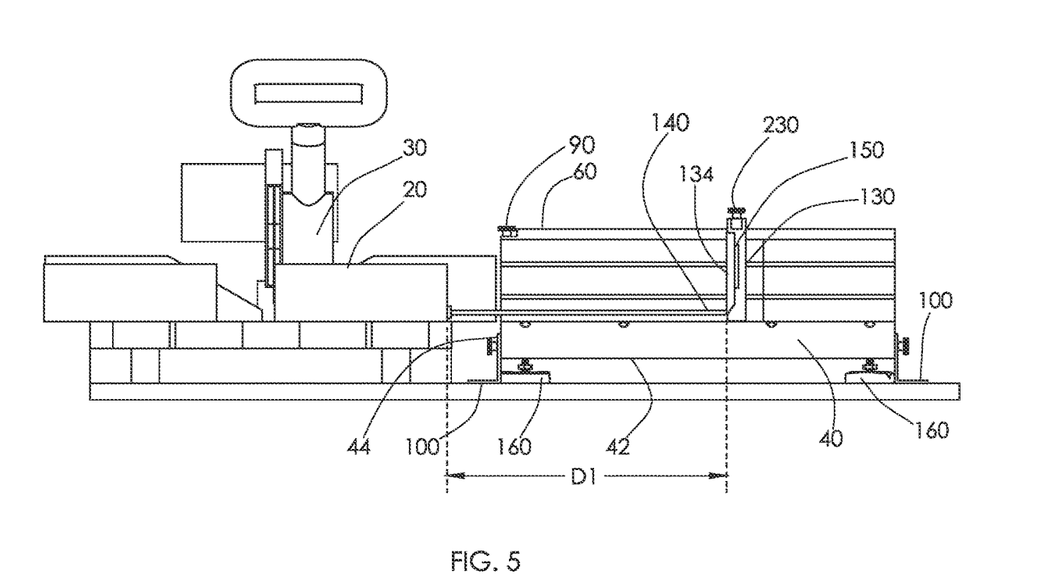
FIG. 5 is a front elevational view of the invention.

The fence 80 preferably includes a left section 200 telescopingly-engaged with a right section 210 of the fence 80. The top edge 88 of the fence 80 is fixed with the right section 210 and includes one of the guides 90 for engaging one of the guide slots 50 in a top side 208 of the left section 200. As such the left section 200 and the right section 210 can be mutually fixed together. The left section 200 and the right section 210 are further slidably fixed mutually together at a telescoping bar 220 that engages a lower groove 82 of each section 200, 210. The right section 210 can move between a collapsed configuration 211 (FIG. 1) and an extended configuration 212 (FIG. 4), in order to accommodate longer workpieces 20. In such an embodiment the flip stop 130 preferably includes a locking thumb screw 230 for fixing the flip stop 130 with the fence 80.

Two side L-brackets 100 are each adapted for fixing with the left side 44 or the right side 46 of the base 40. Each side L-bracket 100 further includes a lower side 110 adapted for fixing with the support surface 15. Each side L-bracket 100 preferably includes at least two vertical slots 170 on an upright portion 120 of the side L-bracket 100. The vertical slots 170 are adapted for receiving a threaded thumb screw 180 that engages a threaded aperture 185 of either the left side 44 or the right side 46 of the base 40, such that the side L-brackets are vertically adjustable on the sides 44,46 of the base 40. The lower side 110 of each L-bracket further includes the slots 170 or apertures for receiving woods screws or other mechanical fasteners for securing the base 40 to the support surface 15, which is typically a wooden bench or plank.

In use, with the fence apparatus 10 fixed with the support surface 15 and the support surface 15 brought into proximity of the tool 30, the workpiece 20 can be supported and guided against the fence 80 to engage the tool 30.

Figure 7:
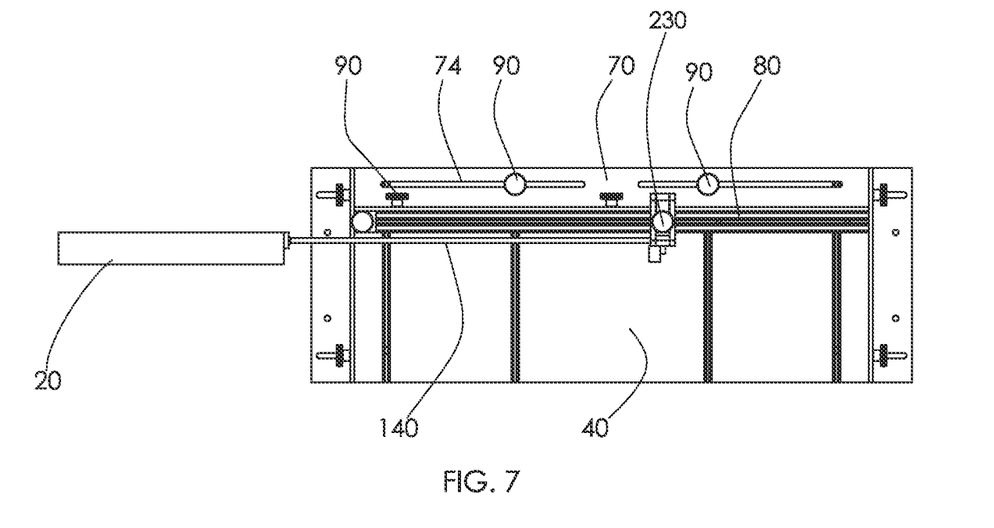
FIG. 7 is a top plan view of the invention.

In some embodiments the fence bracket 70 is L-shaped and includes an upright portion 77 and a lower portion 73. The upright portion 77 includes two or more of the vertical slots 170 each adapted for receiving one of the threaded guides 90 that engage one of the guide slots 50 of a rear side 89 of the fence 80. As such the fence 80 is vertically adjustable on the fence bracket 70. The lower portion 73 preferably has at least one longitudinal slot 74 (FIG. 7) for receiving one or more of the guides 90 therein and for engaging one or more of the guide slots 50 of the top side 48 of the base 40 (FIG. 6), so that the fence assembly 60 is horizontally adjustable on the base 40.

The fence apparatus 10 is fully reversible in the sense that it can be positioned on either a left side of the tool 30 or on the right side of the tool 30. The range finder 150 and the pusher bar 140 can be fixed to either side of the flip stop 130. As such, two of the fence apparatuses 10 can be used on either side of the tool 30 as desired.

Figure 8:
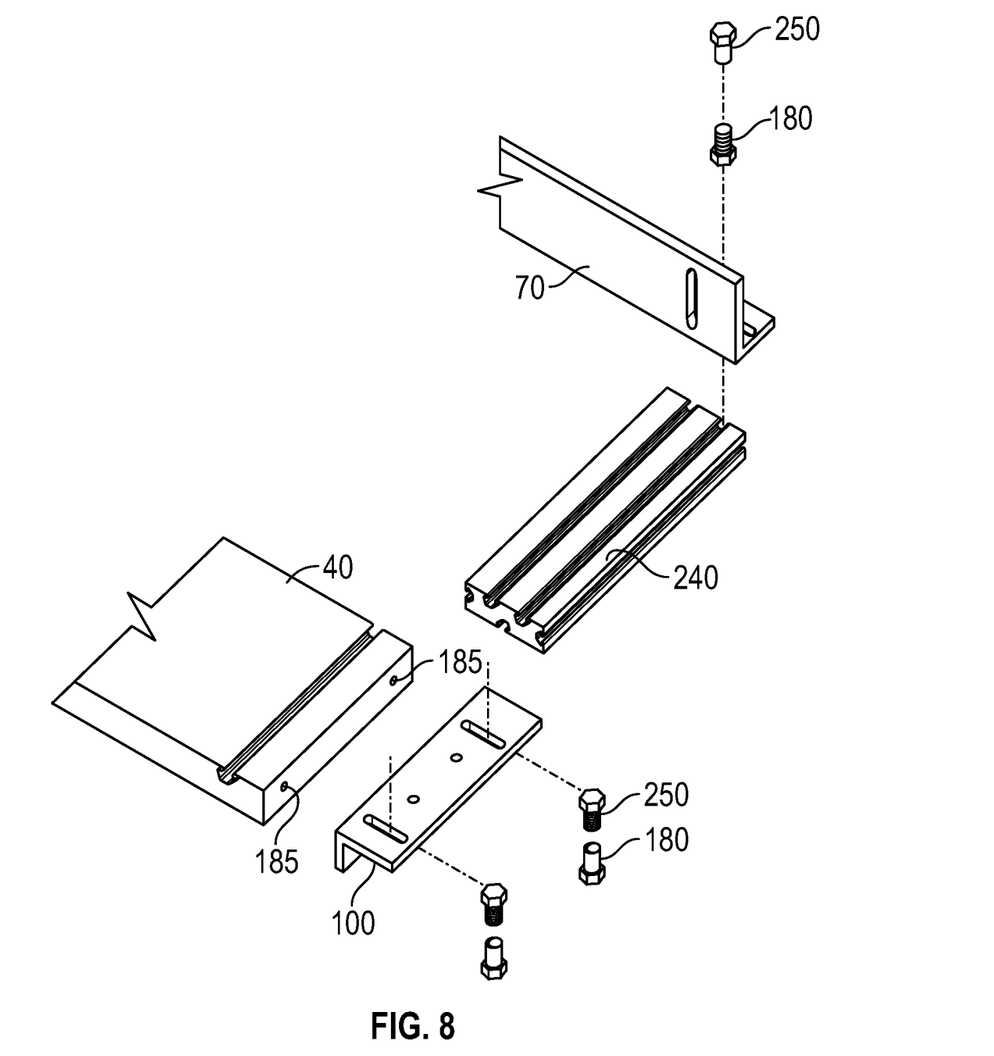
FIG. 8 is a partial exploded perspective view of a table extension of the invention.
Figure 9:
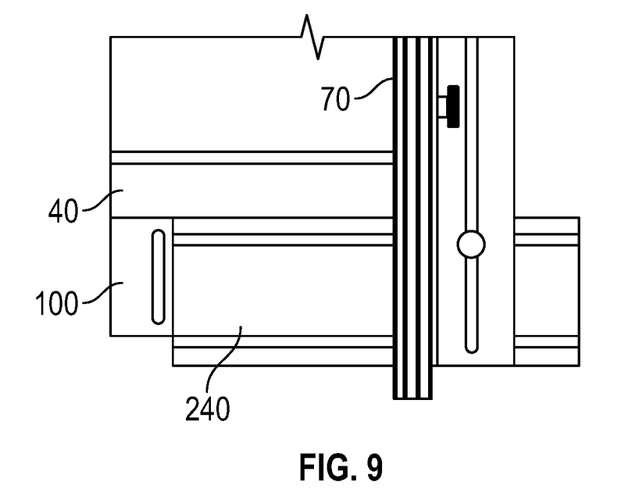
FIG. 9 is a top plan view of the table extension.

In some embodiments, a table extension 240 (FIGS. 8 and 9) is included and the fence bracket 70 is elongated. One of the L-brackets 100, or an additional L-bracket 100, is fixable with the thumb screws 180 to either the left side 44 or the right side 46 of the base 40, but is inverted with respect to the other L-brackets 100. The table extension 240, which is preferably an additional piece of the fence 80, is fixed to the L-bracket 100 with a T-bolt 250 and one of the thumb screws 180 such that the table extension 240 can move forward or backward with respect to the base 40 to extend the effective size of the top side 48 of the base 40. The elongated fence bracket 70 accommodates the additional width of the table extension 240.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A fence apparatus for handling a workpiece and for resting on a support surface disposed beneath the fence apparatus and proximate a tool, the fence apparatus comprising:
   a rigid rectanguloid base having a top side, a bottom side, a front side, a rear side, a left side, and a right side, the top side including a plurality of parallel guide slots disposed between the left and right sides and traversing from the front side to the rear side, the bottom side including at least three height-adjustable feet each adapted for resting on the support surface disposed beneath the fence apparatus;
   a fence assembly including a fence bracket having at least two guides projecting downwardly into at least two of the guide slots of the top side of the base, and the fence assembly including a fence having a front side substantially orthogonal to the top side of the base when the fence assembly is engaged with the top side of the base;
   two side L-brackets each adapted for fixing with the left or right side of the base and each having a lower side adapted for fixing with the support surface disposed beneath the fence apparatus;
   whereby with the fence apparatus fixed with the support surface disposed beneath the fence apparatus and the support surface brought into proximity of the tool, the workpiece can be supported and guided against the fence to engage the tool.

2. The fence apparatus of claim 1 wherein the front side of the fence includes a plurality of parallel longitudinally-aligned guide slots, and wherein the fence assembly further includes a flip stop slidably fixed with the fence.

3. The fence apparatus of claim 2 wherein the flip stop includes a selectively removable pusher bar extending parallel to the fence and adapted for pushing the workpiece close to the tool.

4. The fence apparatus of claim 2 wherein the flip stop includes a range finder for determining a distance between a side surface of the flip stop and the tool.

5. The fence apparatus of claim 2 wherein the flip stop includes a guide for engaging a guide slot formed in a top edge of the fence.

6. The fence apparatus of claim 1 wherein the height-adjustable feet each include a threaded shaft for engaging a threaded aperture of the bottom side of the base.

7. The fence apparatus of claim 1 wherein each side L-bracket includes two vertical slots on an upright portion of the side L-bracket, the vertical slots adapted for receiving a threaded thumb screw that engages a threaded aperture of either the left side or right side of the base, whereby the side L-brackets are vertically adjustable on the sides of the base.

8. The fence apparatus of claim 1 wherein the fence includes a left section telescopingly-engaged with a right section, a top edge of the fence fixed with the right section and including a guide for engaging a guide slot in a top side of the left section for fixing the left and right sections mutually together, the left and right sections further slidably fixed mutually together at a telescoping bar that engages a lower groove of each section.

9. The fence apparatus of claim 2 wherein the flip stop includes a locking thumb screw for fixing the flip stop with the fence.

10. The fence apparatus of claim 1 wherein the fence bracket is L-shaped and includes an upright portion and a lower portion, the upright portion including two or more vertical slots each adapted for receiving a guide that engages a guide slot formed in a rear side of the fence, whereby the fence bracket is vertically adjustable on the fence.

11. The fence apparatus of claim 1 further comprising a table extension, one of the side L-brackets, or an additional side L-bracket, fixable to one of the sides of the base and inverted and fixed to the base with at least two threaded thumb screws that engage a threaded aperture of either the left side or right side of the base, whereby the side L-bracket is vertically adjustable on the sides of the base, the table extension fixed to the side L-bracket with at least two locking thumb screws, the fence being slidably fixed with the table extension to extend the effective size of the base.

12. A fence apparatus for handling a workpiece and resting on a support surface, the support surface disposed beneath the fence apparatus and proximate a tool, the fence apparatus comprising:
   a rigid rectanguloid base having a top side, a bottom side, a front side, a rear side, a left side, and a right side, the top side including a plurality of parallel guide slots disposed between the left and right sides and traversing from the front side to the rear side, the bottom side including at least three height-adjustable feet each adapted for resting on the support surface disposed beneath the fence apparatus, the height-adjustable feet each including a threaded shaft for engaging a threaded aperture of the bottom side of the base;
   a fence assembly including a fence bracket having at least two guides projecting downwardly into at least two of the guide slots of the top side of the base, and a fence having a front side substantially orthogonal to the top side of the base when the fence assembly is engaged with the top side of the base, the front side of the fence including a plurality of parallel longitudinally-aligned guide slots, and wherein the fence assembly further includes a flip stop slidably fixed with the fence, the flip stop including a selectively removable pusher bar extending parallel to the fence and adapted for pushing the workpiece close to the tool, the flip stop further including a range finder for determining a distance between a side surface of the flip stop and the tool, the flip stop further including a guide for engaging a guide slot formed in a top edge of the fence, the fence further including a left section telescopingly-engaged with a right section of the fence, a top portion of the fence fixed with the right section of the fence and including a guide for engaging a guide slot formed in a top edge of the left section for fixing the left and right sections mutually together, the left and right sections further slidably fixed mutually together at a telescoping bar that engages a lower groove of each section, the flip stop further including a locking thumb screw for fixing the flip stop with the right section of the fence, the fence bracket being L-shaped and including an upright portion and a lower portion, the upright portion including two or more vertical slots each adapted for receiving a guide that engages a guide slot formed in a rear side of the fence, whereby the fence bracket is vertically adjustable on the fence; and
   two side L-brackets each adapted for fixing with the left or right side of the base and having a lower side adapted for fixing with the support surface disposed beneath the fence apparatus, each side L-bracket including two vertical slots on an upright portion of the side L-bracket, the vertical slots of each side L-bracket adapted for receiving a threaded thumb screw that engages a threaded aperture of either side of the base;
   whereby the side L-brackets are vertically adjustable on the sides of the base, and whereby with the fence apparatus fixed with the support surface disposed beneath the fence apparatus and the support surface brought into proximity of the tool, the workpiece can be supported and guided against the fence to engage the tool.

13. The fence apparatus of claim 1 wherein the two side L-brackets are each further adapted for being free of direct contact with the fence bracket of the fence assembly when the two side L-brackets are each fixed with at least the left or right side of the base.

14. The fence apparatus of claim 12 wherein the two side L-brackets are each further adapted for being free of direct contact with the fence bracket of the fence assembly when the two side L-brackets are each fixed with at least the left or right side of the base.

* * * * *